Nov. 25, 1941. R. J. LIMBERT 2,263,583
ROAD MARKER
Filed Dec. 20, 1939 2 Sheets-Sheet 1
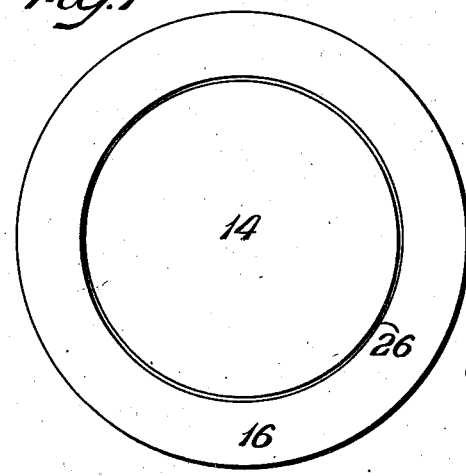
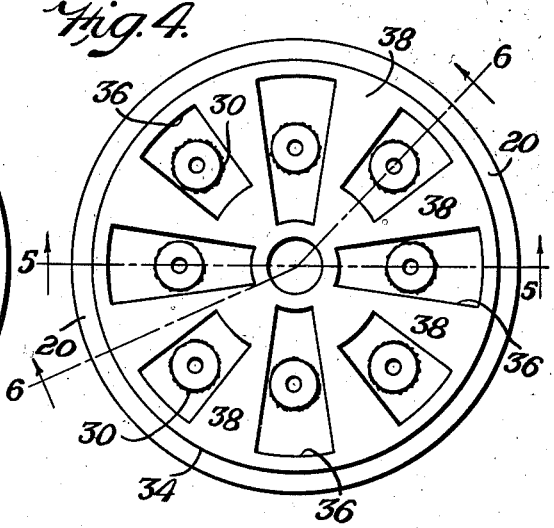
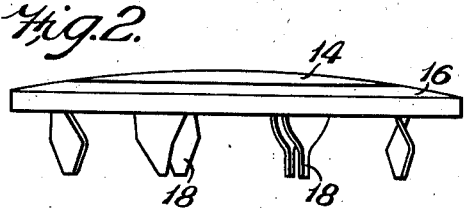
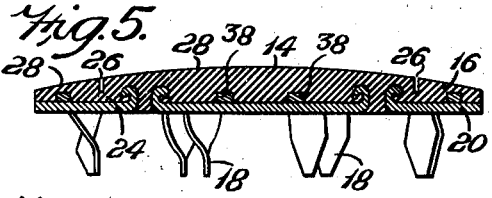
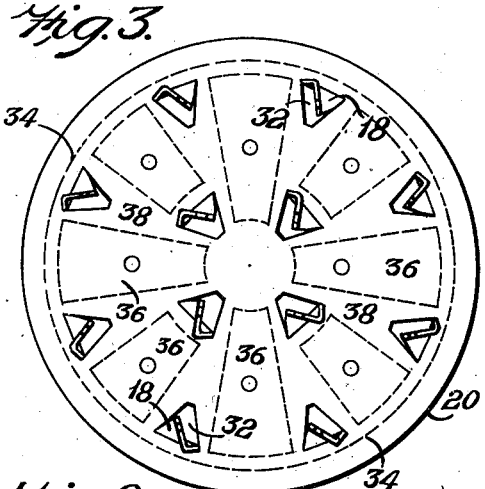
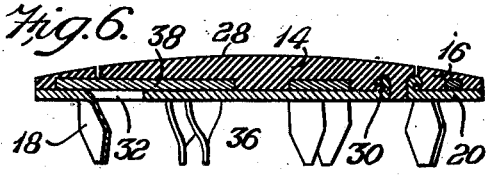
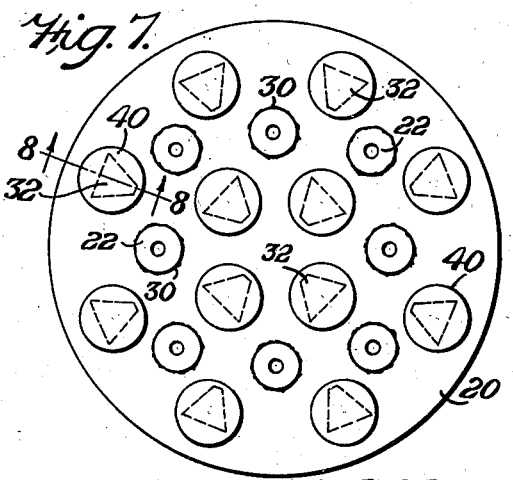
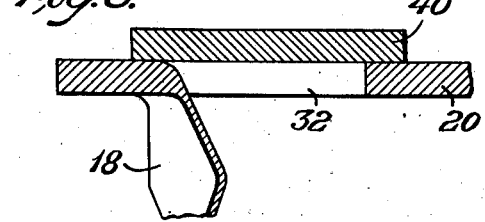
INVENTOR
BY ROLLIN J. LIMBERT
ATTORNEY Nov. 25, 1941.    R. J. LIMBERT    2,263,583

ROAD MARKER

Filed Dec. 20, 1939    2 Sheets-Sheet 2

INVENTOR
ROLLIN J. LIMBERT
BY
Louis Necho
ATTORNEY

Patented Nov. 25, 1941

2,263,583

UNITED STATES PATENT OFFICE 2,263,583

ROAD MARKER

Rollin J. Limbert, Conshohocken, Pa.

Application December 20, 1939, Serial No. 310,157

4 Claims. (Cl. 94—1.5)

My invention relates to a new and useful road marker of the general type disclosed in the Farrell Patent No. 2,166,669, and more particularly to an integrally molded, multi-color marker capable of easy installation and permanent adhesion to the road, with the contrasting colors rendering the same clearly visible in daylight, at night and under adverse weather conditions.

In order effectively and permanently to secure the rubber facing to its rigid base or backing, it is necessary to mold the rubber onto the base and it is undesirable, in making a multi-colored marker, to have to mold separately, or otherwise to secure to the base, two or more separate portions of rubber each having a different color, and therefore my invention still further relates to a novel method of molding a multi-colored marker directly onto the base or backing, which method is the subject matter of a companion application.

My invention also still further relates to the novel construction of a road marker made according to my novel method and in which the body of the marker is colored throughout its thickness so as to present, regardless of wear, contrasting colors, but in which the portions of rubber of different colors are thoroughly integrated and are secured to the base in one operation and in a permanent manner.

My invention still further relates to a road marker which is inexpensive to produce as well as to a novel construction of the base or backing of the marker by means of which I am enabled to produce a molded multi-colored marker embodying the features herein set forth.

In the present disclosure I have illustrated the construction of a marker of one color and of a two-color marker but I wish to point out that my construction lends itself to the production of road markers having more than two colors, without any change in the construction itself and without departing from the spirit or scope of this invention.

Fig. 1 represents a plan view of a two-color road marker embodying my invention.

Fig. 2 represents a side elevation of Fig. 1.

Fig. 3 represents a bottom plan view of Figs. 1 and 2.

Fig. 4 is a top plan view of the marker shown in Fig. 1 with the rubber facing removed to show details of construction.

Fig. 5 represents a section on line 5—5 of Fig. 4 but showing the rubber facing in position.

Fig. 6 represents a view similar to Fig. 5 taken on the line 6—6 of Fig. 4.

Fig. 7 represents a view similar to Fig. 4 showing a modified form of construction.

Fig. 8 represents, on an enlarged scale, a section on line 8—8 of Fig. 7.

Figure 9:
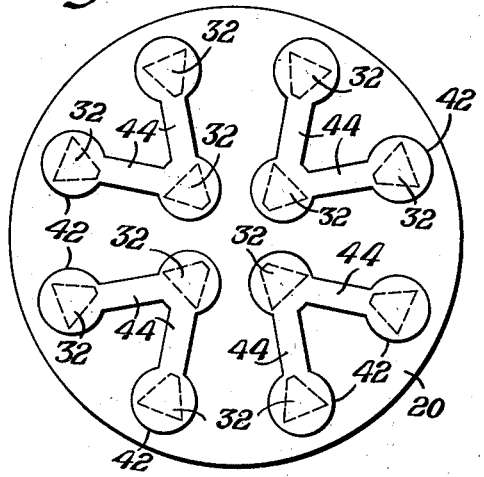
Fig. 9 represents a view similar to Figs. 4 and 7 showing a further modified form of construction.

Referring to the drawings in which like reference characters indicate like parts, and more particularly to Fig. 1, it will be seen that my marker is composed of a central portion 14 which is of one color and which is surrounded by the portion 16 which is of a contrasting color, the colors being preferably white and orange respectively. The marker as a whole and irrespective of its specific construction, which will be hereinafter described is provided with bottom twisted and integrally formed prongs 18 which depend from the underside thereof and by means of which the marker is anchored to a plastic or other cement provided in a recess in the road surface securely to hold the marker to the road surface. The prongs 18 are punched out from and are deflected with respect to the bottom or base plate 20 to which the rubber facings 14 and 16 are secured by adhesion as well as by the gimlets 22 which are punched out of and deflected upwardly with respect to the base 20 as best seen in Figs. 5 and 6. With respect to the rubber facings 14 and 16 it will be seen from Figs. 5 and 6 that the same are united or integrated at their bottom portions as at 24, but they are separated by a narrow slit 26 which extends only part way through the thickness of the rubber facing.

In order to accomplish this result and thus mold together and simultaneously portions of rubber of different colors, I have devised the novel method of molding and apparatus therefor which is described and claimed in a separate companion application but which, in the present application, will be only incidentally referred to in order more clearly to explain the present invention. Thus the rubber facings 14 and 16 are positioned in a mold which is provided with a vertical partition of the thickness and height or depth of the annular slit 26 so that, when compressed and processed, the facings 14 and 16 will present the smooth and slightly convexed continuous surface 28 while the bottom portions of the facings 14 and 16 are allowed to flow together and become integrated into a continuous solid bottom portion. The molding of the rubber facings 14 and 16 on the base plate 20 forces the rubber around the frayed and jagged, downwardly deflected edges 30 of the grummets 22 thus interlocking the rubber facings 14 and 16 to the base plate 20. Since the prongs 18 are punched out of the base plate 20 and thus leave correspondingly shaped openings 32, and in order to prevent the rubber or other plastic, from which the marker may be made, from flowing through the openings 32 during the molding operation, I have devised and utilized a barrier or auxiliary plate which is best seen in Fig. 4 and which is generally designated with the numeral 34. The plate 34 may be a completely solid plate positioned over the base plate 20 and, while that construction will do, I have found that in the interest of lightness, and in order to strengthen the bond between the rubber facings 14 and 16 and the base 20, best results are obtained by providing the cut outs 36 which correspond in their position to the distribution of the gimlets 22 so that the gimlets 22, when punched outwardly and upwardly from the base 20 will project through openings 36. This provides a greater wearing surface of facing above the edges 30 of the gimlets 22 and also provides a greater depth or thickness for the facing to interlock with and below the edges 30 than if the gimlets 22, for instance, were to be punched out of the barrier or any auxiliary plate 34. The solid portions 38 of the plate 34, and which portions intervene between the cut-outs or openings 36, in turn correspond to and cover the openings 32 in the base plate 20 thus blocking the openings 32 and preventing the extrusion of the facing material therefrom while the facing material in its plastic state is being applied to and molded upon the base plate 20. The plate 34 is preferably, slightly smaller in diameter than the base plate 20 as best seen from Figs. 4, 5 and 6 and it is also spot-welded so as to be permanently and rigidly secured to the base plate 20.

The material of the facings 14 and 16 also tends to interlock with the internal edges of the openings or cut-outs 36 thus adding to the adhesion of the facings to the plates 20 and 34. Since the function of the plate 34 is primarily to block the various openings 32 caused by the formation of the prongs 18, and secondarily to reinforce the construction, it follows that within the scope of my invention the plate 34 can be varied in its construction while still effectively performing the required function, and, by way of illustration, I have, in Figs. 7 and 8, utilized the discs 40 each of which is spot-welded or otherwise suitably secured to the upper face of the plate 20 in registration with and covering one of the openings 32, there being as many discs 40 employed as there are openings 32. This is a cheaper construction since the relatively small discs 40 can be punched out of waste and scrap metal which is a by product from some other manufacturing process and the discs 40, in addition to preventing the material from running out of the holes 32, also serve to reinforce the plate 20 at the area adjacent to the edges of the openings 32.

In Fig. 9 I have shown a still further modified form in which, in lieu of the plate 34 or the separate discs 40, I employ a plurality of discs 42 interconnected by the arms 44 so that three of the discs 42 can be handled at one time, and in Figs. 7 and 9, in which there are eight openings 32 along the outer periphery and four openings 32 about the center of the base plate 20, it is only necessary to handle four units in order to cover all twelve openings instead of having to use twelve discs 40 as in the construction shown in Fig. 7.

Figure 10:
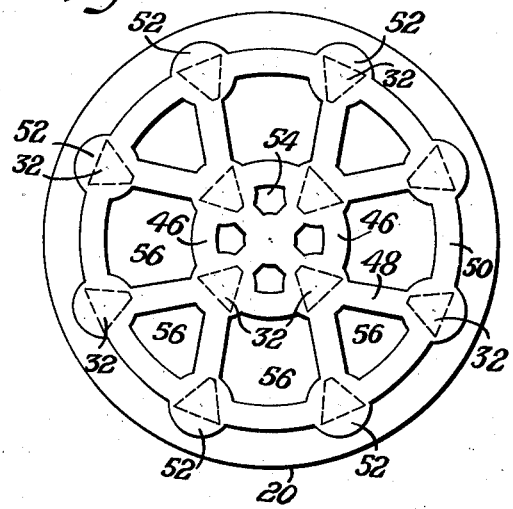
Fig. 10 represents a view similar to Fig. 9 showing a still further modified form of construction.

In Fig. 10 I have shown a still further modification of the plate 34 in which I utilize a spider construction having the central hub 46 which in itself covers the centrally disposed openings 32 and from which radiate the arms 48 which carry the outer ringlike member 50 which is provided with the round portions 52 for registering with and covering the outer openings 32. In the construction illustrated in Figs. 9 and 10, and due to the fact that they are only intended to show possible modifications of the reinforcing and barrier plate 34, I deemed it unnecessary to show the gimlets 22, but it is to be understood that the gimlets 22 in the construction shown in Fig. 9 will be distributed throughout the base plate 20 in the spaces or intervals between the discs 42 and arms 44, and in the construction shown in Fig. 10 the gimlets can project upwardly through the central openings 54 or through the spaces 56 intermediate the arms 48.

Figure 11:
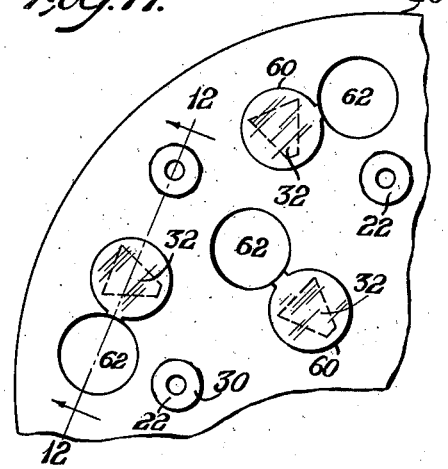
Fig. 11 represents a fragmentary plan view similar to Figs. 9 and 10 showing another modification.

Since the function of the auxiliary plate 34 in Fig. 4, the discs 40 in Fig. 8, the discs 42 and arms 44 in Fig. 9, and the hub 46 and discs 52 of Fig. 10, is primarily to cover the openings 32 resulting from the punching out of the prongs 18, I have shown in Fig. 11 a still further modified form of construction in which I dispense with all of the auxiliary plates or discs just referred to by punching out of the plate 20 the discs 60 which discs are slightly larger than the openings 32, said discs being deflected through an angle of 180° and made to rest against their adjacent openings 32 thus covering the openings 32 and reinforcing their edges. The punching out of the discs 60 naturally leaves corresponding openings 62, but these openings are not objectionable since, during the molding operation, these openings 62 are blocked off or covered and closed by the corresponding solid portion of the mold, whereas the portion of the mold corresponding to the openings 32 must be open in order to accommodate the prongs 18. In other words, the mold in which this marker is made comprises two parts, one corresponding to the upper surface of the marker as shown in Fig. 1, and the other part of the mold corresponds to the bottom surface of the marker as shown in Fig. 3, and the second half of the mold must necessarily have as many apertures in it as there are prongs 18. The portions of the mold corresponding to the solid areas between the openings 32 are solid themselves, so that, if there were to be an opening in the plate 20 such as the opening 62, such opening will be closed by the body of the mold and will not permit extrusion of the material of the facing during the operation.

Figure 13:
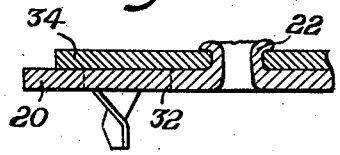
Fig. 13 is a fragmentary section showing a still further modified form of construction.

In Fig. 13 I have shown a further modified form of construction in which the auxiliary plate shown in any of the foregoing figures is secured to the base plate 20 by the simple expedient of the grummets 22 punched out of the base plate 20 and swedged on top of the auxiliary plate (such as the plate 34), the grummets 22 being either additional grummets for securing the base plate and auxiliary plate together, or being the same grummets to which the rubber facing is secured, it being understood that in Fig. 13 the rubber facing is omitted.

Figure 14:
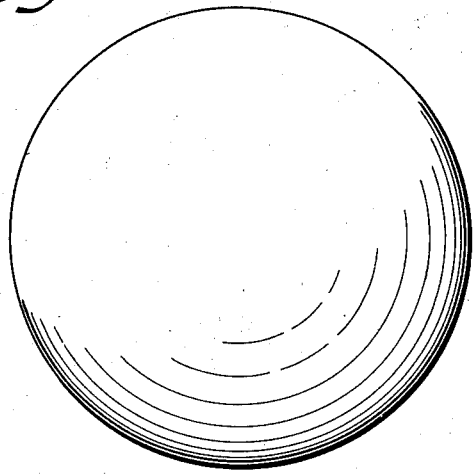
Fig. 14 represents a view similar to Fig. 1 showing a one-color road marker constructed according to the showing of any of the preceding figures.
Figure 12:
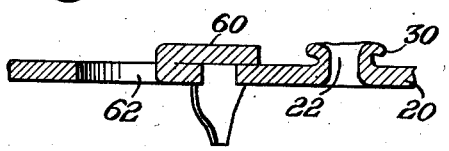
Fig. 12 represents a section on line 12—12 of Fig. 11.

In Fig. 14 I have shown a road marker which is identical in its method of molding, as well as in its construction, as the marker shown in Fig. 1 except that the facing of the marker in Fig. 14 is made of one solid color throughout instead of the correspondingly colored portions 14 and 16 as shown in Fig. 1, it being also understood that any of the modifications shown in Figs. 4, 7, 8, 10 or 11 can be embodied in the construction of the marker shown in Fig. 14, but, inasmuch as the only difference is the absence of the slit 26 which separates the contrasting rubber portions 14 and 16, it was not deemed necessary to reiterate the entire description or duplicate all the drawings in connection with the single piece and one-color marker in Fig. 14.

With respect to the prongs 18, while I have shown and described the same as being twisted, it is to be understood that the same can be punched out straight as they will serve equally well, and more particularly because, when the marker is placed in position on the road surface and tamped down, the initially straight prongs will become more or less deflected and twisted for effective engagement. Also, with respect to the gimlets or grummets 22, while they are helpful in the engagement or interlocking of the rubber facing with the base plate, I have found that due to my novel method of manufacture the rubber facing can be made to adhere to the base without the grummets 22.

Having thus described my invention, what I claim as new and desire to secure by Letters Patent is:

1. A road marker comprising a base plate, a plurality of fastening prongs punched out of said plate and projecting at an angle with respect to one side thereof, whereby a plurality of openings are formed in said base plate, a second plate superimposed upon the other side of said plate for closing said openings, and a facing secured to the side of said base plate opposite to the side with respect to which said prongs project.

2. A road marker comprising a base plate, a plurality of prongs punched out of said plate and projecting at an angle with respect to one side thereof whereby a plurality of openings are formed in said base plate, an auxiliary plate having openings therein and solid portions between said openings, said auxiliary plate being secured to the other side of said base plate with the solid portions of said auxiliary plate covering the openings in said base plate, and a facing secured to said base plate and said auxiliary plate.

3. A road marker comprising a base plate, a plurality of prongs punched out of said base plate and projecting at an angle with respect to one side thereof whereby a plurality of openings are formed in said base plate, a plurality of closures punched out of said base plate at points adjacent to said openings, said closures being deflected upon themselves and brought into registration with said openings, and a facing secured to the side of said base plate opposite to the side with respect to which said prongs project.

4. A road marker comprising a base plate, a fastening prong punched out of said base plate and projecting at an angle with respect to the underside thereof, whereby an opening is formed in said base plate, a closure superimposed on the upper face of said base plate for closing said opening, a grommet punched upwardly through said base plate, the upper rim of said grommet being swedged downwardly, and a facing secured to the upper side of said base plate.

ROLLIN J. LIMBERT.